Figure 1:
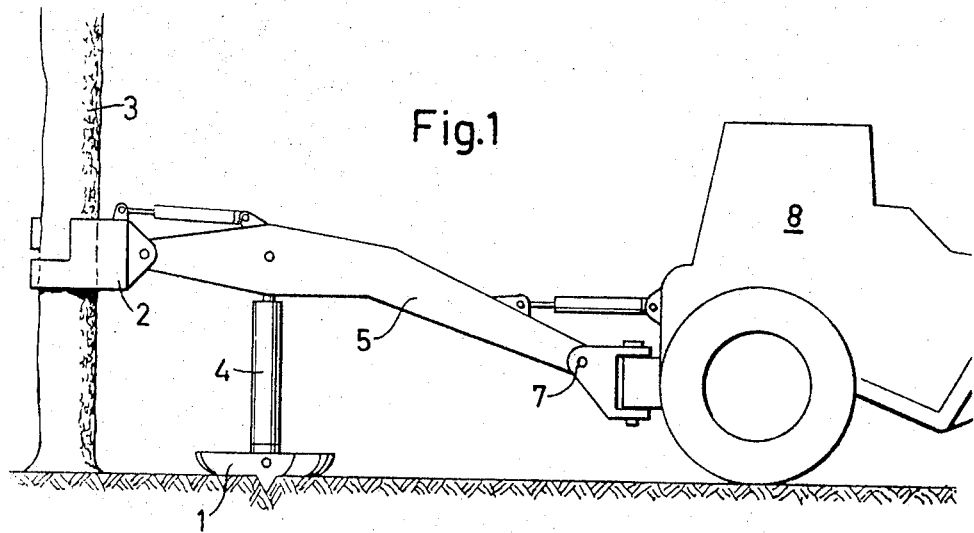

United States Patent [19]
Widegren et al.

[11] 3,871,427
[45] Mar. 18, 1975

[54] DEVICE FOR FELLING TIMBER

[76] Inventors: Lars Harald Widegren, Arent Frapegatan 31, Kiruna; Tage Oskar Keskitalo, Knavagen 9, Tuolluvaara, both of Sweden

[22] Filed: Oct. 29, 1973

[21] Appl. No.: 410,571

Related U.S. Application Data

[60] Continuation-in-part of Ser. No. 73,251, Sept. 16, 1970, Pat. No. 3,802,663, which is a division of Ser. No. 807,775, March 17, 1969, Pat. No. 3,643,900.

[30] Foreign Application Priority Data

June 28, 1968 Sweden.............................. 8943/68

[52] U.S. Cl............. 144/34 E, 144/3 D, 144/34 R, 254/132
[51] Int. Cl............................................. A01g 23/08
[58] Field of Search......... 144/2 N, 3 D, 2 Z, 34 R, 144/34 E, 309 C; 254/124, 132; 37/2 R

[56] References Cited
UNITED STATES PATENTS

| | | | |
|---|---|---|---|
| 1,675,413 | 7/1928 | Johnson | 144/2 N |
| 2,530,399 | 11/1950 | Pilgrim | 144/2 N |
| 3,590,894 | 7/1971 | Boyd | 155/3 D X |
| 3,802,663 | 4/1974 | Widegrem et al. | 254/132 |

*Primary Examiner*—Andrew R. Juhasz
*Attorney, Agent, or Firm*—Sughrue, Rothwell, Mion, Zinn & Macpeak

[57] ABSTRACT

A timber-felling apparatus which draws a tree up with its roots the tree being first pulled out of the ground in a vertical direction and thereafter prized at an increasing angle thereto. The apparatus has means to cut off all or a portion of the roots attached to the tree during the pulling out thereof or after the tree has been pulled out.

5 Claims, 16 Drawing Figures

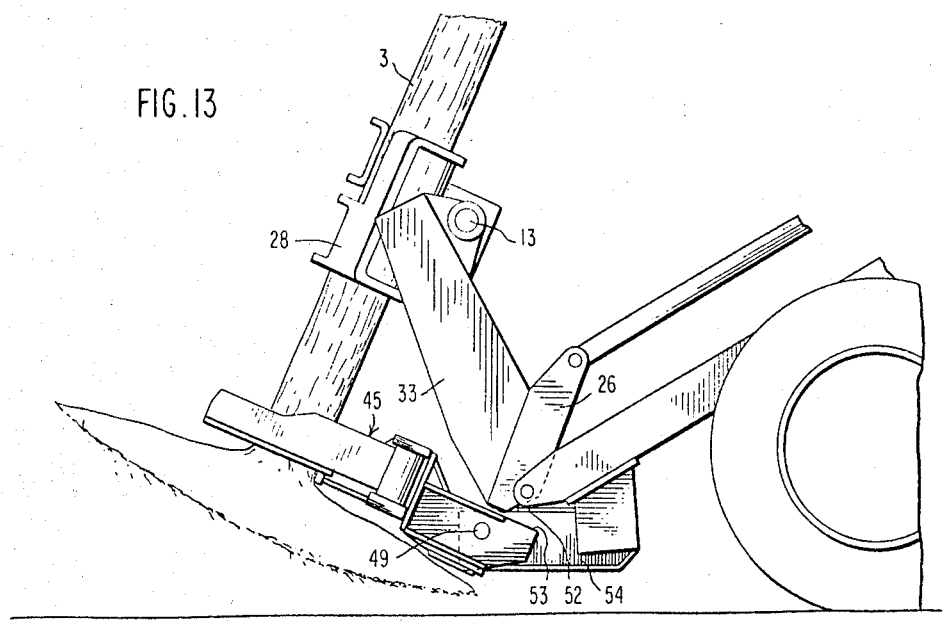
FIG. 13
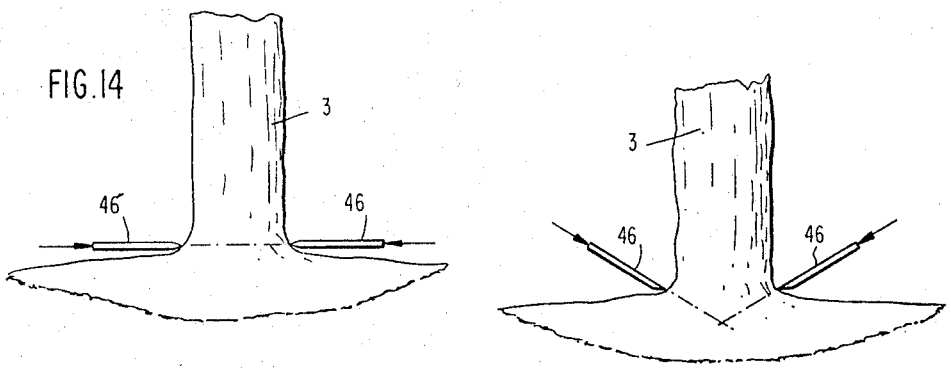
FIG. 14
FIG. 15
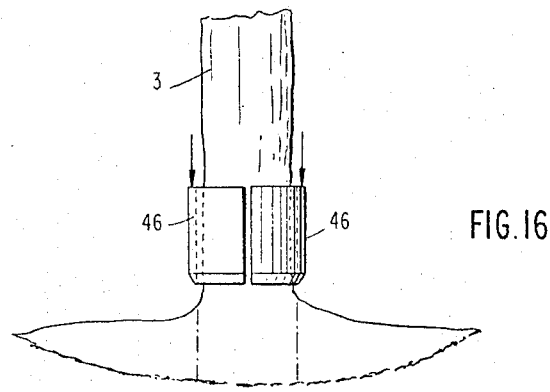
FIG. 16

DEVICE FOR FELLING TIMBER

This application is a continuation-in-part of pending application Ser. No. 73,251 filed, Sept. 16, 1970, now U.S. Pat. No. 3,802,663 which is a division of patent application Ser. No. 807,775 filed, Mar. 17, 1969, now U.S. Pat. No. 3,643,900.

The present invention relates to an apparatus for felling timber.

In conventional timber-felling the trees are usually felled with a power-saw, the attempt being made to cut the tree as close to the ground as possible. One cannot come lower on the trunk than the ground, however, and there is always a stump left. Felling with a power-saw, moreover, involves a risk of personal injury, and every year a number of accidents occur in this connection. Another disadvantage of this conventional procedure is that the stumps must be treated to prevent noxious insects from building their nests in them, and the ground also requires some treatment for the regrowth of new forest. According to another, more modern procedure timber-felling is done with hydraulic shears attached to a tractor or the like, which nips off the trees close to the ground. The same disadvantages, however, exist in this case, in addition to which, when cutting with hydraulic shears damage occurs to the fibrous structure of the wood in the vicinity of the cut. Such damage takes the form of cracks at the lower end of the trunk, whereby the yield of timber is inferior to that from felling with a power-saw.

Another known method is to pull up small trunks, stalks, stems or the like, e.g., creepers, by their roots with a manually handled lever device (French Pat. No. 834,943).

For stump-pulling a hydraulic device is known (Norwegian Pat. No. 22,081), by means of which a shears-like gripping device grips the stump which is to be pulled up with its roots immediately from above. This device is not suited for timber-felling, however, owing to the construction of the gripping device among other reasons.

Finally a method of felling trees with roots is known, in which the device for felling, loading and removal of the tree makes use of the dynamic force in the fall of the tree for pulling up the roots and loading of the tree (German Auslegeschrift 1,167,102). By this method, however, the roots running immediately under the device are not pulled out of the ground. Furthermore, it requires at least two implements, one pivoting on a horizontal axis, which is attached to or close to the tree at a given distance above the ground, and a second, e.g., a tractor or the like, which pulls or pushes down the tree. The device has the disadvantage of not pulling up long roots on the side on which the tree falls, and the felling is slow and cumbersome.

The present invention is aimed at eliminating the said disadvantages and at creating an apparatus for timber-felling and a quick, reliable and rationally operating, preferably one-man operated, timber-felling device, the driver of which can remain in his position during felling and skidding.

The invention thus relates to an apparatus for timber-felling by means of which the trees are pulled up by their roots by a mechanical device. The apparatus is chiefly characterized by the fact that the trees are pulled out of the ground initially in a principally vertical direction and thereafter prized at an increasing angle thereto.

The apparatus of this invention comprises at least one point of support on the ground and at least one lever. It is chiefly characterized in that the lever is pivoted in the point of support or in a beam, frame, bracket or similar item connected to it, that a lifting device directly or indirectly bears upon the lever, that to the lever is connected at least one hydraulically or pneumatically operated gripping device gripping the tree from the side, and that the device is coupled to a motor vehicle having a drive for the lifting and gripping device.

Other characteristics and advantageous further developments of the device appear from the following specification and claims.

The advantage of employing the apparatus according to the invention is that the tree is entirely pulled away from its attachments in the soil, in particular also on the side on which it falls. Pulling up and prizing in the direction away from the pulling-up device is advantageous when the tree is merely to be felled, while skidding and other operations are postponed to another occasion or are carried out with another device. Felling can then be done very quickly at the rate of several trees per minute. Prizing towards the pulling-up device is adopted when the tree is to be laid on the pulling-up device or on a device coupled to it for transporation or skidding. Several trees in succession can then be pulled up and laid on the pulling-up device or the like, so relationalizing the skidding work.

By coupling the device according to the invention to a conventional machine of suitable type, for example a tractor, which may be an agricultural tractor, or a loader, great advantages are gained compared with conventional timber-felling. The forest worker can remain seated throughout in his machine, in which case, with a suitable machine, he is comparatively unaffected by the weather conditions and runs a considerably small risk of accidents. By means of the devices proposed according to the invention trees can be felled in the desired direction, which reduces the risk of damage to adjacent forest. The need to treat stumps against insects is eliminated and the soil is automatically exposed without additional cost, which is important for regrowth. By using a root limitation or root cutting device, the quantity of soil which otherwise tends to accompany the root is reduced. Other advantages are that the felling time when using the device according to the invention is short, as also is the total working time. The accident risk is also reduced. The quantity of wood felled increases, furthermore, and this is one of the great advantages of this invention. Investigations have shown that the wood in the thicker roots has a different length of fiber than the remainder of the wood. This means that pulp produced therefrom is more suited for papermaking, for example, thanks to its greater strength. Furthermore the yield of pulp from trees pulled up by the roots is considerably greater than from conventionally felled trees. Apart from the aforesaid advantages, by making use of stumps and roots, turpentine and other products can be extracted which are concentrated at the lowest part of the tree.

The invention will now be described with reference to the attached drawings.

Figure 2:
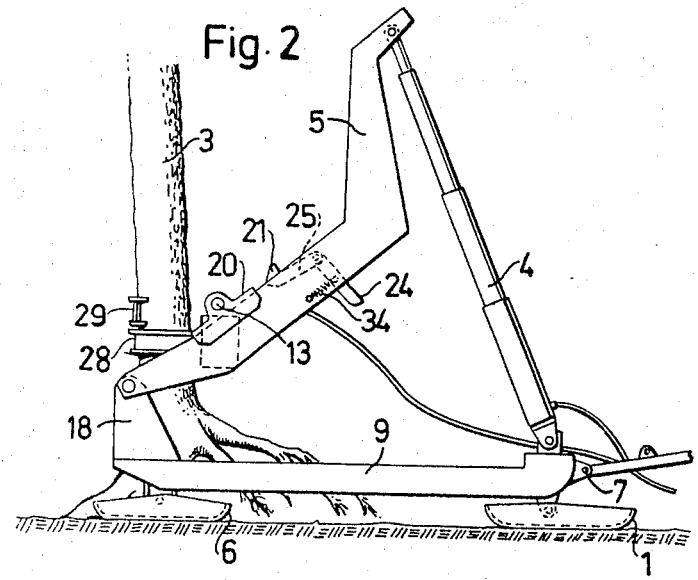
Figure 3:
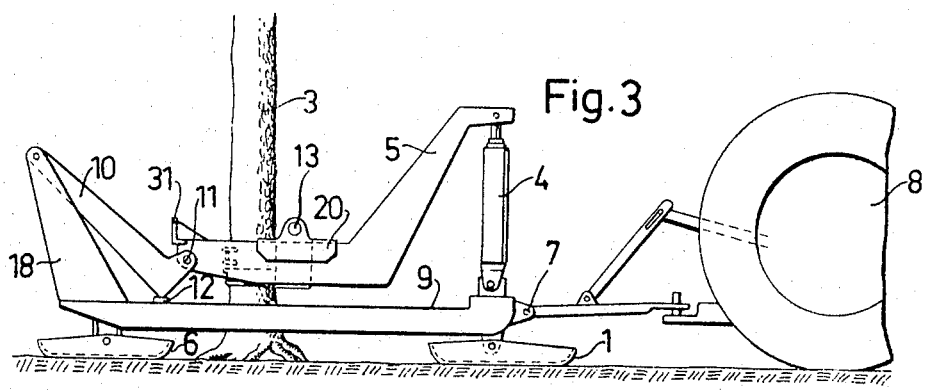
Figure 4:
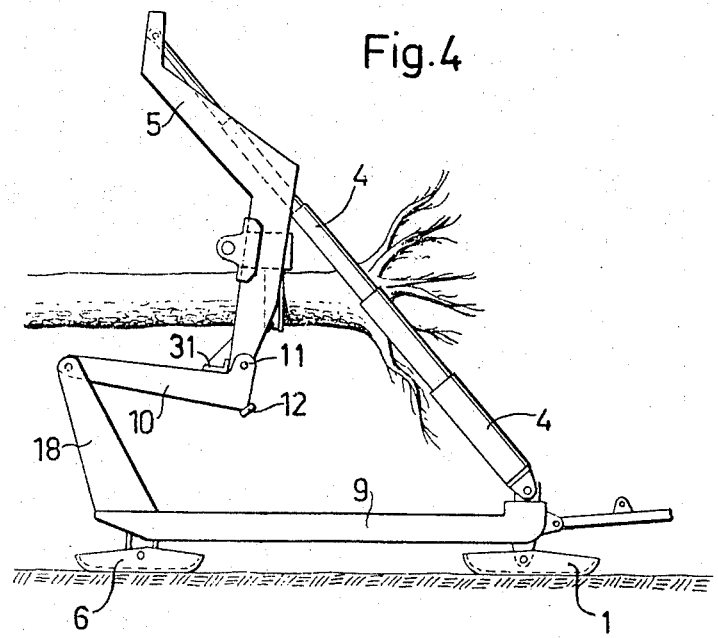
Figure 5:
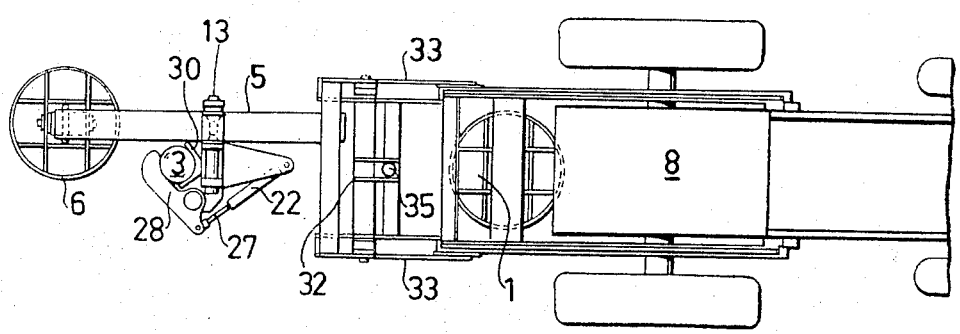
Figure 6:
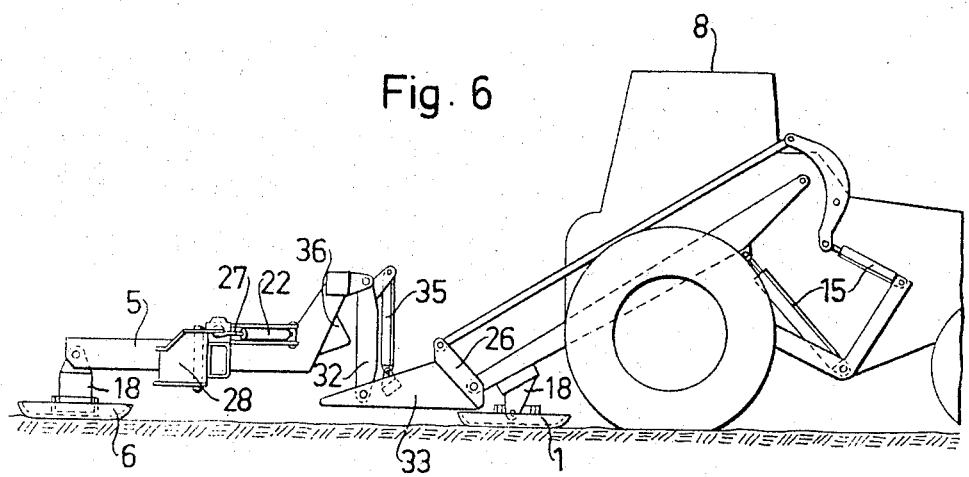
Figure 7:
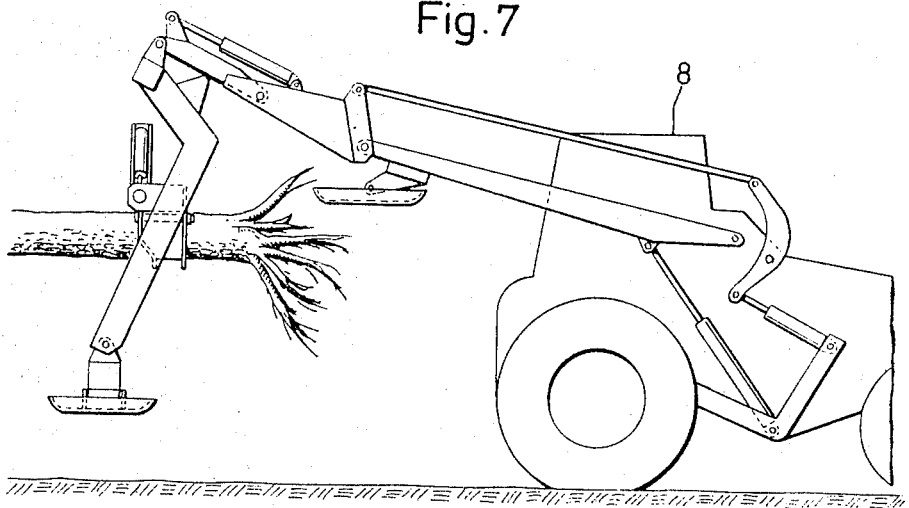
Figure 8:
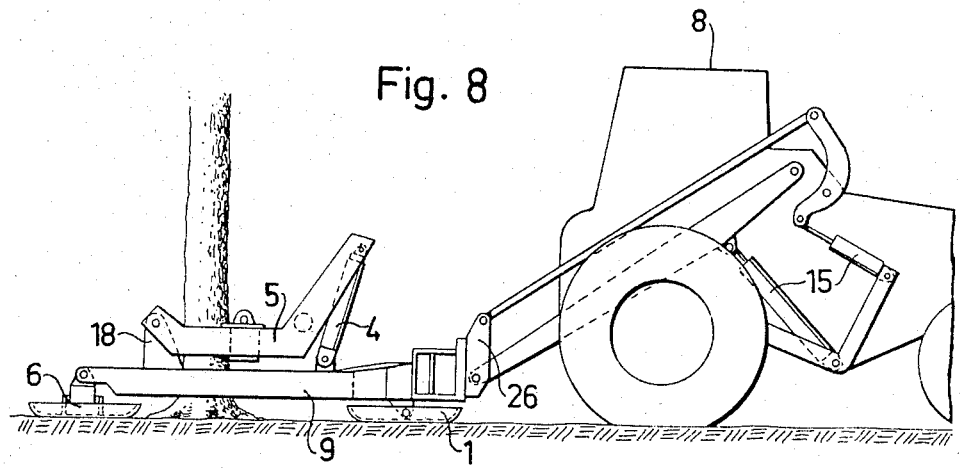

FIG. 1 shows a device according to the invention, coupled to a motor vehicle,

FIG. 2 shows a device with three points of support linked to a beam or frame construction with a gripping device pivoted in the vertical plane and sliding in the horizontal plane during pulling-up and prizing, FIG. 3 shows another embodiment of the invention with a modified lever consisting of two arms linked together, FIG. 4 shows the embodiment in FIG. 3 in another working position, FIG. 5 shows a device according to the invention, viewed from above, mounted on the bucket attachment of a tractor loader, so as to use the hydraulic equipment of the tractor, there being two points of support, FIG. 6 shows the embodiment in FIG. 5 viewed from the side, FIG. 7 shows the embodiment in FIG. 6, with a pulled-up tree in carrying position, FIG. 8 shows a modification of the preceding embodiment, the pulled-up device having its own lifting device.

Figure 9:
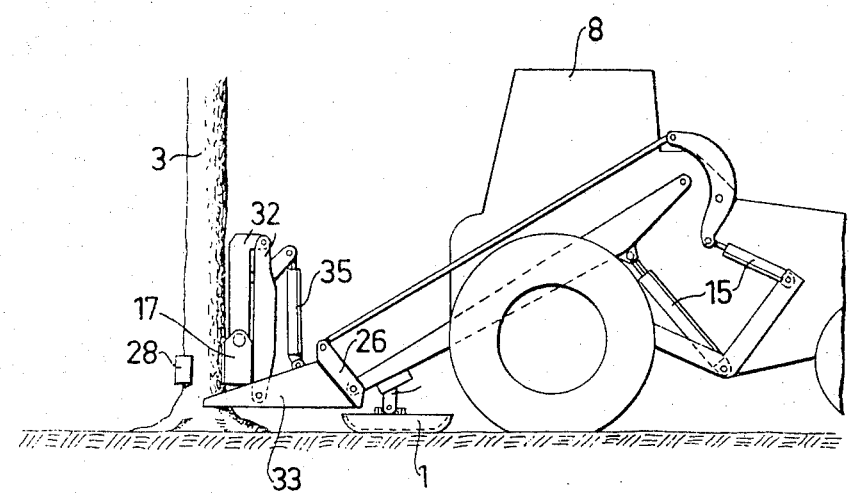
Figure 10:
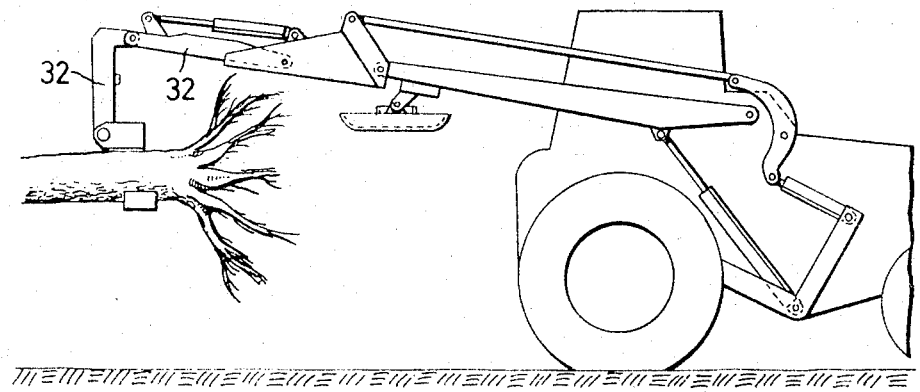
Figure 11:
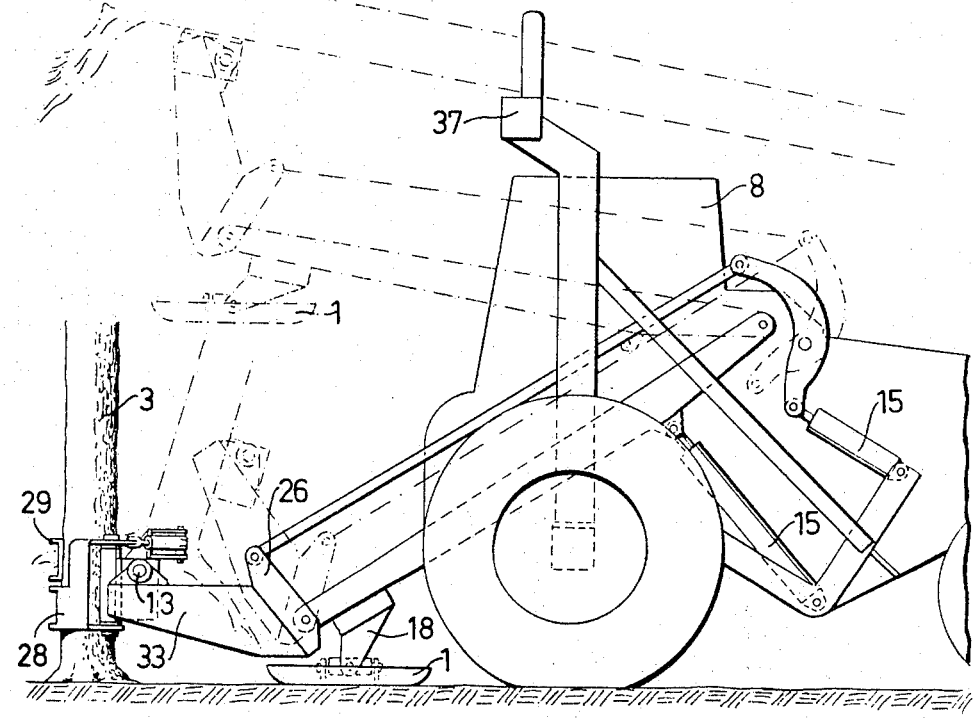
Figure 12:
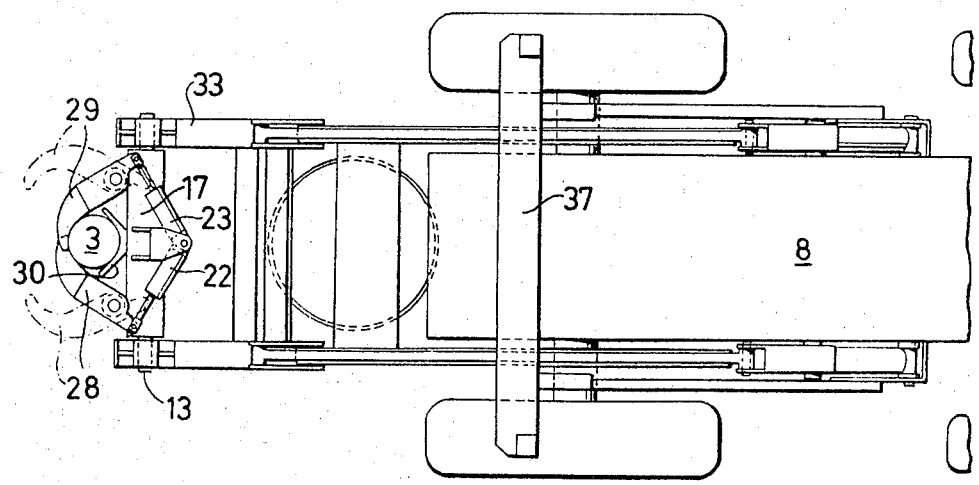

FIG. 9 shows a further, simplified embodiment of the invention coupled to a tractor and making use of its hydraulic equipment, FIG. 10 shows the embodiment in FIG. 9 with a pulled-up tree in carrying position, FIG. 11 shows a device similar to the preceding one, but for prizing towards the pulling-up device and laying of the tree on the roof of the tractor-loader, and FIG. 12 shows the same embodiment, viewed from above.

FIG. 13 is an elevational view showing a root limiting device in conjunction with the pulling up device shown in FIGS. 11 and 12, and FIG. 14 through 16 are schematic views of various types of cutting means that may be used in the root limiting device shown in FIG. 13.

FIG. 1 shows schematically a device according to the invention. It consists of a point of support 1, for example in the form of a circular or oval plate which, on its side facing the ground, may have an antislip device, e.g., in the form of one or more projections. To the point of support is linked a lifting device 4, here consisting of a hydraulic or pneumatic cylinder. Associated with this cylinder, of course, is a device for supplying it with working medium, which is not reproduced in any of the drawings but is assumed to exist on the motor vehicle. The other end of the lifting device is linked to a lever 5 with a gripping device 2 intended to grip the tree 3 which is to be pulled up. The entire device is linked via a link, joint 7 or the like, to a motor vehicle 8, as shown in FIG. 1. By arranging an extra hydraulic cylinder in connection with the lever and tractor the point of support 1 can be released from and lowered into the ground. By means of extra hydraulic cylinders the gripping devices can be set to different pivoting positions, in itself not an absolutely necessary detail.

Whereas FIG. 1 shows the general principles of the device, in the sequel some practical embodiments will be described. Identical reference notations have been used for identical parts on the drawings insofar as has been considered advisable.

FIG. 2 thus shows a side view of an embodiment of the device according to the invention, coupled in the conventional manner to a tractor 8 by means of a drag link carried in two joints 7 on a Y- or U-shaped beam or frame structure 9. The beam or frame structure 9 is in turn carried on a point of support 1 in the form of a front supporting plate and two additional points of support 6 in the form of broad skis and at its free ends terminates in two upward-directed brackets 18, of which only one is seen in FIG. 2. One or two levers in the form of beams 5 are pivoted in the said bracket 18. Between the beams 5 is a cross-beam 17 (see FIG. 12) which, with horizontal end journals 13, is pivoted in beam slides 20 which can slide on the two beams 5 and are locked to the beams 5 on the right of the figure. This locking is achieved through the fact that one shank 24 of an angular detent arm 25 abuts the frame or beam structure 9 and so tensions a draw-spring 34 when the beams 5 are roughly in horizontal position. The beam slide 20 can thus move freely past the projection 21 on the detent arm 25. The said detent arm 25, however, will constitute a stop for the slide 20 if the latter, in FIG. 2, is on the right of the projection 21 and the beams 5 are raised so far that the shank 24 is unobstructed by the frame structure 9 and is thereby actuated by the draw-spring 34. The detent, of course, may have a different construction.

The cross-beam 17 carries the gripping device 2, which is shown in FIG. 12 and comprises two hydraulic cylinders 22 and 23 supplied from the tractor in the known manner. The hydraulic cylinders 22 and 23 are connected each to its claw 28 and 29, respectively, which are movable essentially in the horizontal plane. A stop 30 is fixed to the cross-beam 17 and serves as a bearing surface for the trees to be pulled up. The gripping device 2 can — but need not — be supplemented by means, also unillustrated, for holding the gripping devices in the correct position in unloaded condition for gripping the next tree.

Between the fore ends of the Y- or U-shaped beam or frame structure 9 and the beams 5 is the lifting device 4 in the form of two hydraulic cylinder units which here consist of telescopic cylinders and are operated from the tractor in the known way. The bracket 18 can also be formed with or as hydraulic cylinders, whereby, with the aid of the hydraulic cylinder units, a tree can be lifted entirely vertically or prized in the desired direction, or one after the other.

When the device according to the invention, connected to a tractor 8 or the like, is to be used for pulling up a tree by the roots, the device is backed into contact with the tree, the claws 28 and 29 being initially separated. The tree 3 is thus brought into contact with the stop 30. The hydraulic cylinders 22 and 23 of the gripping device are actuated and the claws 28 and 29 close around the tree. Working medium is then pumped to the hydraulic unit of the lifting device 4, whereby the levers 5 are pressed upwards under rotation around the articulation points in the brackets 18 so that the tree, clamped between the claws, is exposed to a lifting and prizing movement. If the tree is rigidly fixed in the ground, it is advisable, before drawing it up, to drive the tractor a bit forward until the beam slides 20 are close as possible to the end of the beams 5 pivoted on the bracket 18. A preliminary lift is then made with the hydraulic cylinder units, a large lifting force for small distance of lift being obtained owing to the great leverage. After this lift has been completed, the tractor is driven closer to the tree and one or more additional lifts are made with less leverage — and consequently less force, which can then be permitted — on each occasion. The final lift, by which the tree is felled, is made for example with the beam slides close to the tractor so that the beam slide 20 will be locked by the projection 21 on the detent arm 25. Through the hydraulic force and the weight of the tree in the fall the roots have then bean entirely pulled out of the ground or torn off and the trunk lies roughly parallel with the ground surface. The tractor can then be driven forward and skid the tree to the desired position. There the tree can be released by opening the gripping devices, i.e., the claws 28 and 29, after which the outfit is driven to the next tree to be pulled up.

FIGS. 3 and 4 show another embodiment of the device according to the invention, in which the levers 5 constituting the beams are divided into two arms 5 and 10. The brackets 18 have a greater height then in the earlier embodiment in FIG. 2. The two other arms 10 of the levers are each fitted with a support 12 in the form of a stop plate close to the pivoting point 11, where they are intended to be brought into contact with the beam or frame structure 9. The two other arms 5 pivot around their respective journals in their mating arms 10 and have each their stop 31 which can be made to bear against the mating arm 10. The arms 5, 10 of the levers can thus be pivoted around the pivoting point 11 only to a limited extent in relation to one another.

With the embodiment in FIGS. 3 and 4 the work is started in the same way as with the preceding embodiment. When the lifting device 4 is used, the cross-beam 17 will first be lifted upwards with great force, since the lever arm is then comparatively short, and at the same time pulls the tree 3 with roots upwards and at an angle to the longitudinal direction of the tree. When the stop 31 of the lever 5 rests against the mating arm 10, the now angular lever 5, 10 is rotated in its entirety round the bearing point in the bracket 18, thus with longer lever arm, up to the position in FIG. 4, when the tree is fully pulled up, felled and placed in carrying position for skidding to a suitable place. The heaviest work, namely the first part of the releasing of the roots from their attachments in the ground, is done in the position shown in FIG. 3, and in the sequel therefore one can work with a longer lever arm to gain a greater distance at the expense of less force. Furthermore the telescopic lifting device in the first of the telescopic stages here shown has the greatest force, which thereafter diminishes stepwise. The cross-beam 17 can be fixed in a specific position between the levers 5 or can be slidable between the beam slides 20 in the same way as in the preceding embodiment in FIG. 2.

FIGS. 5–7 show another embodiment of the invention in which the tractor from the earlier embodiments has been replaced by a loader 8 of conventional type. In this case the gripping device 2 is a symmetrically placed on a lever 5 formed by a single beam, with two supporting plates 1 and 6. The lifting device 4, however, is here replaced by the hydraulic cylinders 15 of the loader. The gripping device 2 comprises only one hydraulic cylinder 22, a piston-rod 27 and a claw 28. The gripping device is shown fixed in a specific position on the lever 5 but can, of course, also be made movable along the lever. FIG. 5 shows the device from above, while FIGS. 6 and 7 show side views with the device in starting and final positions, respectively.

As the power source for pulling up the tree in this case, the penetrating force and the lifting force of the bucket attachment 26 of the loader is used. To compensate for the movements between the prizing arms 33 and the lever 5, which are movable on non-coinciding arcs with different radii of curvature, which, among other things, would lead to horizontal movements between the loader and the pulling-up device during the work, it may be advisable to fit a rigid link 32 between prizing arms 33 and the lever arm 5. To achieve a stable joint when the pulling-up device is in empty, carrying position, a single-acting hydraulic cylinder 35 can be fitted between prizing arms and the link and a supporting projection 36 at the lever 5 in the manner shown in FIGS. 6 and 7.

FIG. 8 shows a side view of a further embodiment of the invention in which a pulling-up device similar to that in FIG. 2 is coupled to the bucket attachment 26 of a loader and journalled for horizontal ratational movement ane possibly also for vertical guiding movement. The first heavy lift here takes place with lifting cylinder 4 which has a considerably shorter length of stroke than the telescopic lifting devices used in the embodiments in FIGS. 2–4. The final lift is effected with the hydraulic cylinders 15 of the loader 8, the beam or frame structure 9 being lifted under rotation around the bearing points of the two additional supporting plates 6. A certain horizontal displacement of the loader occurs in this process.

On loaders with a very great penetrating force the cross-beam 17 in FIGS. 9 and 10, with the gripping device 2 fixed in this case, can be placed on the lifting or prizing arms of the loader without additional levers 5. In the final stage the lifting force of the loader is used. The prizing arms, as in the aforesaid embodiments with the loader, are fixed to their existing implement attachments (bucket attachments) 26. The supporting plate 1 is also coupled by suitable means to the latter.

In order, in the embodiment in FIGS. 9 and 10, to achieve a compensation for the movement occurring during pulling-up of the tree, and to provide space for the roots when the tree has been felled, a link system 32 may be used. The object of the hydraulic cylinder 35 is partly to stabilize the link and partly to achieve a prizing moment in the first stage of the prizing movement.

The aforesaid embodiments may also be coupled to a linkage-steered tractor. This type of tractor, as is known, has a hydraulic steering link between the towing unit and loading unit. The device according to the invention can in such case replace the loading unit, while the coupling device should be made rigid in relation to the beam or frame structure 9 and adapted to the existing steering link. If it is necessary to remove the load from the towing unit during application of the lifting moment, a vertically adjustable front supporting plate can be arranged, which can also include a root limiting device.

In all pulling-up devices dealt with hitherto the direction of felling of the tree — insofar as this has been shown or can be seen — is preferentially away from the tractor or from the lifting device 4. According to a further development of the invention — in accordance with the embodiment in FIGS. 11 and 12 — the pulling-up device is designed and used for prizing and felling towards the lifting device, and so towards the vehicle 8, in this case a shovel loader. For this purpose there is arranged above the vehicle at least one bearing surface, for example in the form of a bunk 37, on which several trees can be accommodated close together. In this case the pulling-up starts preferentially from the outset by felling towards the vehicle, the roots on the side of the tree furthest from the device being torn out first, the tree tipping towards the bunk 37 and the weight of the tree, supported by the lifting force of the machine, assisting in entirely pulling up the tree and tearing off the roots on the side of the tree facing the device. When several trees have been pulled up in this way and placed on the bunk 37, they are carried on the loader 8 to, for example, a storage site for further handling or processing.

The device in FIGS. 11 and 12 can also be furnished with two bunks 37 spaced at a suitable distance apart; in some respects this facilitates driving with a load and protects young forest and undergrowth. This form is also suited for taking up telegraph poles, masts and the like, and for placing them in holes in the ground.

Numerous other modifications of the embodiments described can be made within the scope of the invention. Some or all of the hydraulic devices can, of course, be replaced by others, for example pneumatic or mechanical. The additional points of support, i.e., the rear pairs of skis 6, may for example be combined with wheels, in which case, however, it must be ensured that the large loads at the moment of lifting are practically entirely taken up by the skis. The front point of support 1 may be replaced by a ski, which it is advantageous to make liftable to assist in backing of the outfit. This can also be an advantage when driving forwards, as weight can thereby be transferred to the tractor driving wheels. In some cases, however, the risk of rearing of the vehicle must be observed; in embodiments according to FIGS. 11 and 12 this risk is very small.

Among other auxiliary devices may be mentioned devices for limitation of the amount of root pulled up, a pruning and possible debarking device, and in some cases a crane for lifting trees off and on, so that several trees can be carried on the device according to the invention over long distances. In addition to the root limiting device, the device according to the invention can be combined with a cutting device which cuts the tree either entirely or only particlly, so forming a nick, after which the tree is broken off when being pulled up. In this case, however, the stump and roots remain in the ground. In deep-frozen ground it has proved difficult to pull up a tree by the roots, and in such cases the tree has broken off between the ground and the gripping device. In order to be able to decide where the brake should take place, said cutting device may constitute a valuable accessory and permit the use of the device also under the same winter conditions.

FIG. 13 illustrates an example of a root limiting device 45 that may be disposed beneath the gripping means or jaw members 28 and 29 of the pulling up device shown in FIGS. 11 and 12. The root limiting device 45 may be pivoted about an axis 49 which is connected to the frame of the vehicle by arm 54. The arm 54 may provide an extra point of support if the wheels of the vehicle should sink into the ground owing to the high load created by an uprooted tree. The root limiting device 45 may be further provided with a projection 53 beyond the pivot axis 49. The projection 53 is adapted to engage an abutment portion 52 when the root limiting device is in a rest or horizontal position. The angular movement of the root limiting device 45, therefore, is limited by the projection 53 and abutment portion 52. Although the root limiting device 45 is shown attached to the frame of the vehicle, it may also be in the form of a separate tool or attached to the prizing arms 33, to the gripping jaws 28 and 29, or to the cross beam 17, shown in FIG. 12.

As shown in FIGS. 14 through 16, the root limiting device 45 may include various types of hydraulically driven cutting blades 46 for partially or completely removing the roots from the uprooted tree 3. Although FIG. 14 shows two such blades, one blade may be utilized if the device is used for cutting relatively small trees. If two or more blades are used, they may be operated individually or simultaneously.

Although the invention has been described with reference to a number of its embodiments, it can be arbitrarily varied within the scope of the following claims.

What we claim is:

1. An apparatus for felling timber by pulling up trees with their roots, comprising:
   a. at least one ground support member,
   b. at least one lever arm pivotally mounted to the ground support member at one end,
   c. a lifting device bearing upon the lever arm,
   d. at least one hydraulically operated gripping device coupled to the lever arm for gripping the tree trunk from the side,
   e. drive means coupled to the lifting and gripping devices,
   f. a driving source feeding said drive means,
   g. a plurality of cutting blades disposed in a plane perpendicular to the longitudinal axis of the tree, and movable to cut the tree from opposite sides thereof, and
   h. hydraulic means to move the blades to sever the roots from the tree.

2. Apparatus according to claim 1 wherein one of the cutting blades is movable independently of the other.

3. An apparatus for felling timber by pulling up trees with their roots, comprising:
   a. at least one ground support member,
   b. at least one lever arm pivotally mounted to the ground support member at one end,
   c. a lifting device bearing upon the lever arm,
   d. at least one hydraulically operated gripping device coupled to the lever arm for gripping the tree trunk from the side,
   e. drive means coupled to the lifting and gripping devices,
   f. a driving source feeding said drive means,
   g. a plurality of cutting blades of a semicylindrical shape with a cutting edge on one end, movable in a direction parallel to the longitudinal axis of the tree to sever the roots therefrom, and
   h. hydraulic means to move the blades to sever the roots from the tree.

4. Apparatus according to claim 3 wherein one of the cutting blades is movable independently of the others.

5. An apparatus for felling timber by pulling up trees with their roots, comprising:
   a. at least one ground support member,
   b. at least one lever arm pivotally mounted to the ground support member at one end,
   c. a lifting device bearing upon the lever arm,
   d. at least one hydraulically operated gripping device coupled to the lever arm for gripping the tree trunk from the side,
   e. drive means coupled to the lifting and gripping devices,
   f. a driving source feeding said drive means, g. a plurality of cutting blades each located in a different plane and wherein the angle between the planes of the blades and the longitudinal axis of the tree is less than 90 degrees and the blades move toward each other to sever the roots from the tree, and h. hydraulic means to move the blades to sever the roots from the tree.

* * * * *